April 3, 1951  J. HART  2,547,118
BISCUIT AND LIKE CUTTING AND EMBOSSING MACHINE
Filed Nov. 24, 1945  3 Sheets-Sheet 1
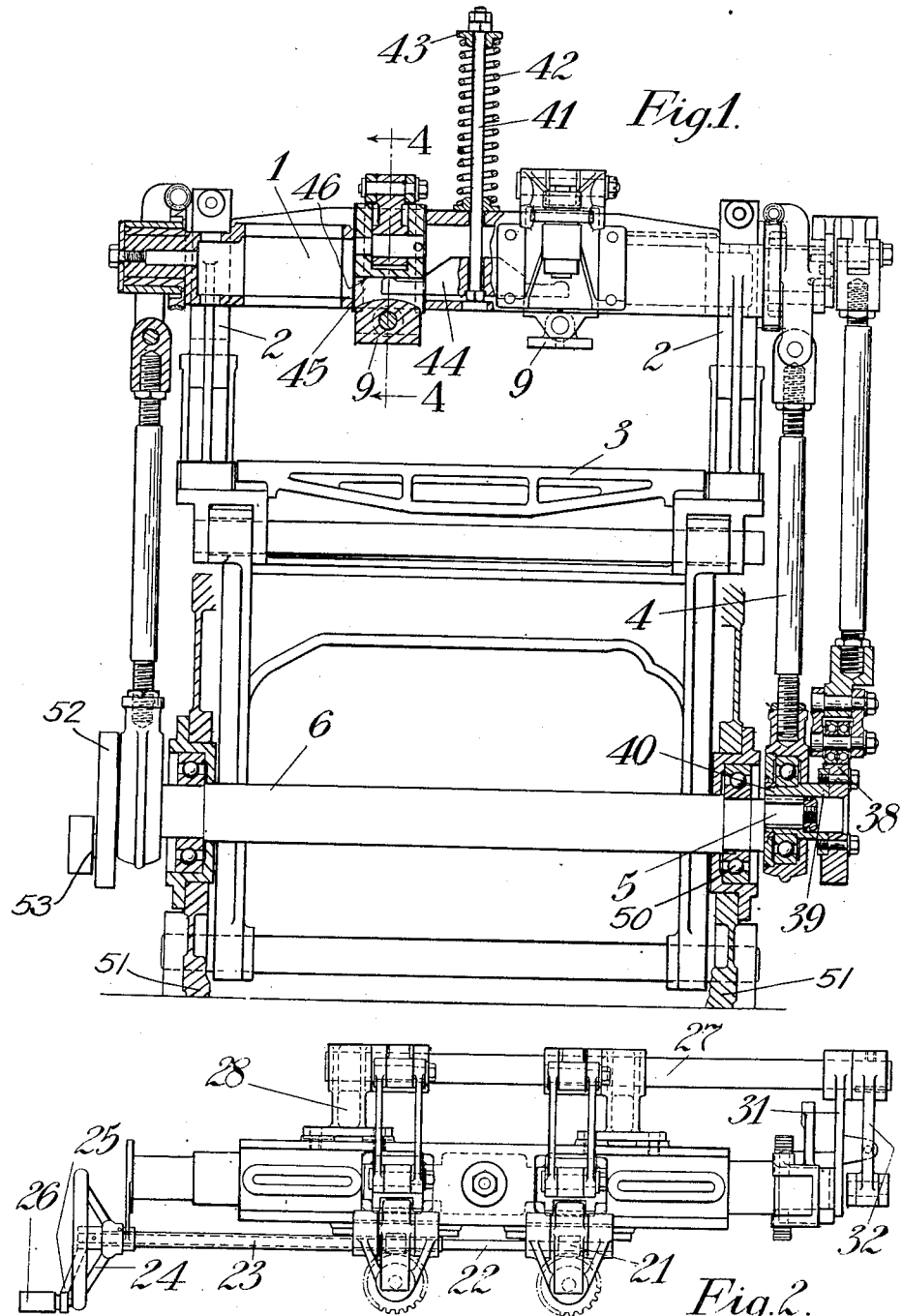

April 3, 1951          J. HART          2,547,118
BISCUIT AND LIKE CUTTING AND EMBOSSING MACHINE
Filed Nov. 24, 1945          3 Sheets-Sheet 2
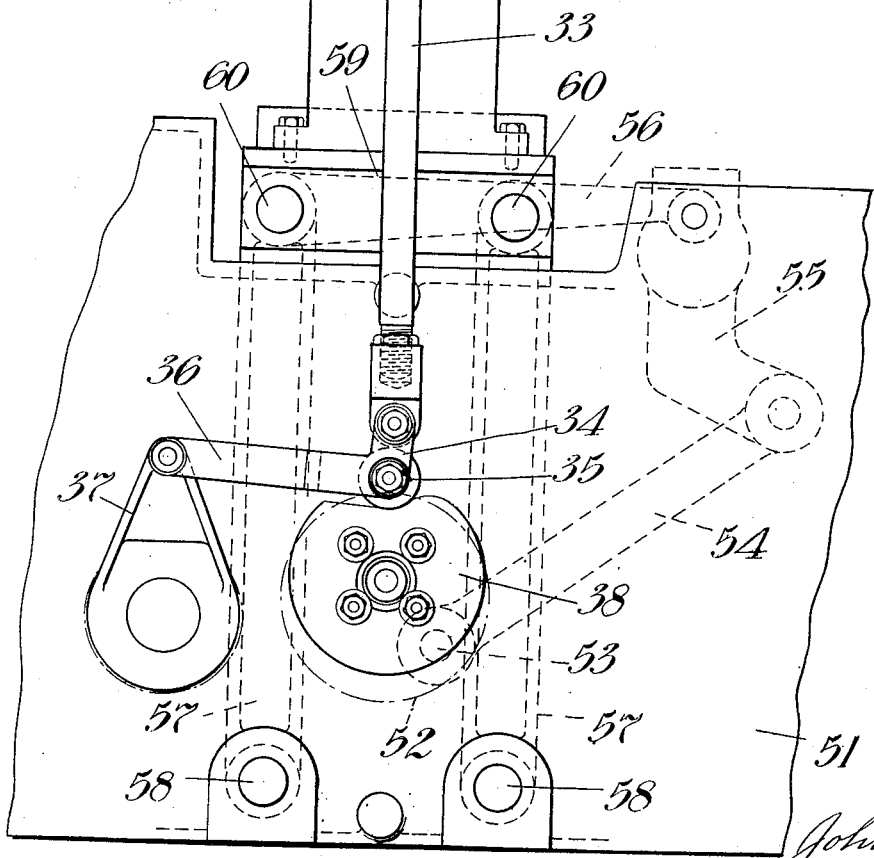

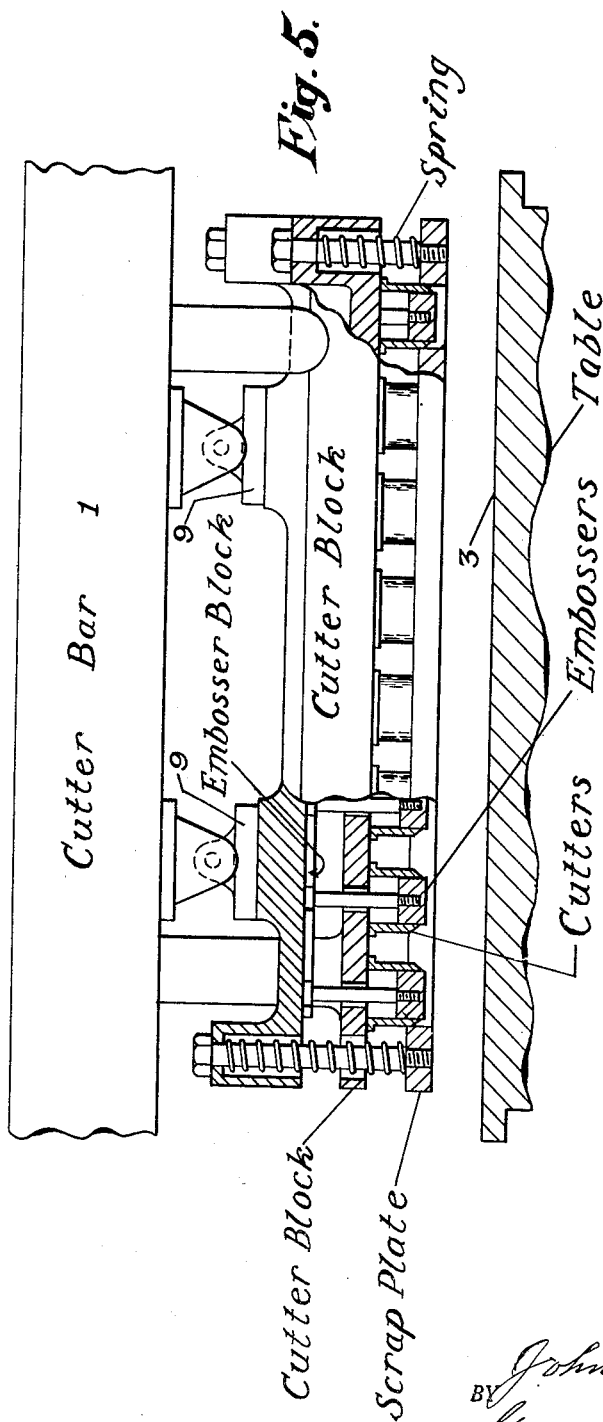

Patented Apr. 3, 1951

2,547,118

UNITED STATES PATENT OFFICE 2,547,118

BISCUIT AND LIKE CUTTING AND EMBOSSING MACHINE

John Hart, Peterborough, England, assignor to Baker Perkins Incorporated, Saginaw, Mich.

Application November 24, 1945, Serial No. 630,647
In Great Britain November 30, 1944

9 Claims. (Cl. 107—24)

This invention relates to cutting and embossing mechanism for biscuit and like dough cutting and embossing machines.

There are at present two main types of machine in general use. In one of these types the cutter assembly is carried upon and operated by a crosshead or cutter bar actuated by eccentrics and the embosser assembly is carried and operated by a second and independently cam-actuated embosser bar or crosshead. The other type of machine in general use comprises a single crosshead or bar which carries the cutters while the embossers, although having movements independent of the cutting reciprocations of the cutting bar, are actuated through mechanism carried by said cutter bar.

In the first-mentioned type of mechanism the cutter cups are fixed to a cutter plate or block bolted to the cutter bar, the scrap plate being mounted in spring-loaded relation on the cutter plate. The embossers are fixed in an embosser plate or block carried by the embosser bar or second crosshead, the embossers being depressed upon the dough against the action of strong springs by cams acting on the embosser bar. After impression of the dough the embosser bar and embossers are retracted by the springs as controlled by the shape of the cams, the whole impressing and retraction of the embosser bar being independent of the cutter bar.

In the second type of mechanism, the cutter cups are also fixed to a cutter plate or block carried by the cutter bar and the scrap plate is mounted in spring-loaded relation on the cutter block but the embossers are fixed to a plate or block mounted in spring-loaded relation on the scrap plate. The embossers are positively actuated to impress the dough for example by eccentrics which operate through toggle or like mechanism and shoes carried by the cutter bar but unconnected with the embosser assembly. When the embossers have impressed the dough the toggle mechanism is retracted and the embossers are raised by their springs clear of the dough and take up a position approximately level with the scrap plate, after which the cutters are retracted past the embossers which thus act to eject the cut biscuits.

Both of the above types of cutter and embosser motions have certain advantages and disadvantages, and an aim of the present invention is to provide improved cutting and embossing mechanism which possesses advantages of both types while avoiding disadvantages thereof. The improvements incorporate the reduction of the reciprocating masses inherent in the type first mentioned by the elimination of a second (embosser) crosshead or bar and involve the adoption of a single crosshead as referred to in the second type above while retaining the flexibility, smoothness of action and scope of control of the embosser movements possessed by the independent cam-controlled embosser bar of the first type.

In both types the cutter and embosser assembly is positively secured to the cutter bar so that any motion imparted to the bar will also be imparted to the cutters and embossers. There is, however, in both types an additional movement between the cutters and the embosser, this movement being performed by means of eccentrics carried on the cutter bar and these eccentrics are in turn operated by a side-crank-driven connecting rod. In my improvement, while the cutters and embossers as a unit are moved up and down, by reason of being fixed to the cutter bar which is in turn moved up and down by the eccentrics, the embossers are displaced bodily in relation to the cutters, by means of worm gear and lever mechanism mounted on the cutter bar. In addition the embossers are, by means of a cam and lever mechanism, displaceable relatively to the cutters. This mode of operation is not attainable in either of the earlier types previously alluded to.

The invention consists in a biscuit and like dough cutting and embossing mechanism comprising a reciprocating cutter bar carrying known cutters and known scrap plates, an embosser partaking of the cutter bar motion but capable of independent reciprocation in relation thereto; embosser depressing means carried by the cutter bar for imparting downward reciprocation to the embossers in relation to the cutter bar and cutters, and cam means adapted to actuate said embosser depressing means to effect the embossing action.

The invention also consists in biscuit and like dough cutting and embossing mechanism comprising a reciprocating cutter bar carrying the cutters and scrap plate assembly; an embosser assembly secured to embosser depressing means carried by the cutter bar, for imparting a downward reciprocation to the embossers in relation to the cutter bar. Such motion is superimposed on the downward motion of said bar against the action of spring means carried by the cutter bar, and cam means adapted to actuate said embosser depressing means for impressing the dough and controlling the retraction of the embossers by said spring means.

In order to enable cutter and embosser mechanism, such as above indicated, to be operated temporarily for cutting without embossing, means are provided for disconnecting the cam means from the embosser depressing means. For example, the cam follower may be displaced out of the cam path.

The spring means carried by the cutter bar may be a single spring having its abutment against the cutter bar and acting on the embosser assembly through the embosser actuating means.

According to one form, the embosser actuating means comprise a pair of lever actuated sliders spaced transversely of the machine on the cutter bar and carrying shoes to which the embosser assembly is secured, and independently or collectively operable adjustment means for varying the setting of either or both of said sliders relatively to the cutting bar.

In the accompanying drawings:

Figure 1 is a side view partly in section of a biscuit cutting and embossing mechanism according to the invention, Figure 2 is a plan of the cutter bar and embosser adjusting means.

Figure 3 is an end view corresponding to Figure 1, and

Figure 4 is a section on line 4—4 of Figure 1.

Fig. 5 is a side view, partly in section, showing a reciprocatable cutter bar carrying known cutters and known embossers that are capable of independent reciprocation in relation to each other; being a type of cutter and embossing mechanism to which my present improvements are applicable, as shown for example in Patent No. 1,660,552.

My invention may be embodied according to one convenient mode by way of example, in which a cutter bar 1 arranged transversely of the cutting machine and adapted to reciprocate in vertical slideways 2 which are rockable with the cutter table 3 so that during the cutting and embossing operation relative horizontal movement between the cutters and embossers and the dough sheet is eliminated. Any suitable eccentric or other means may be employed for vertically reciprocating the cutter bar in the slideway and for rocking the slideways and cutter bar. In the construction shown the cutter bar 1 is coupled by the coupling rods 4 to crank pins 5 on the driving shaft 6. The driving shaft 6 is mounted in bearings 50 in the side frame 51 and is driven by gearing (not shown) in known manner. At one end the shaft 6 is provided with a crank disc 52 the crank pin 53 of which is coupled by a rod 54 to an oscillating lever 55. The lever 55 is connected by rod 56 to one of the pivots of the mounting for the table 3. Such mounting comprises parallel link elements 57 which are pivoted at their lower ends to the frame 51 by rods 58 while at their upper ends they are pivoted to the mounting 59 for the table 3 and slideways 2 by pivot rods 60.

The cutter bar 1 has located within or upon it a pair of transversely spaced vertical guides or slideways 7 each adapted to receive a hollow sliding member or sleeve 8 (hereinafter referred to as the slider). Each slider 8 has pivotally attached to it a shoe 9 adapted to be bolted or otherwise secured to the embosser block or plate (not shown). It is not essential that the shoes should be secured to the embosser block or plate as long as the arrangement is such that contact between the shoes and the block or plate is constantly maintained.

Within each slider and mounted upon a horizontal gudgeon pin 10 or the like, the axis of which is arranged transversely of the machine, is a bell-crank lever one arm 11 of which extends more or less longitudinally of the machine while the other 12 extends upwardly and is arranged approximately vertically. The lower or short arm 11 of the bell-crank lever is in contact with the lower end of an abutment strut 13 so that when the upper end of the other (longer) arm 12 of the lever is oscillated the axis of the gudgeon pin 10 is depressed and the slider 8 and shoe 9 are correspondingly pushed downward within the slideway 7. The upper end of the abutment strut 13 is bedded against the adjacent arm 14 of a double-armed lever pivotally mounted in a bearing 15 carried by the cutter bar 1 and arranged at the side of the shoe slideway. The other arm 16 of the lever bears upon an adjustable stop which may comprise a screwthreaded pin 17 integral with a plunger 18 operating in guide means 19 and having a worm wheel nut member 20 mounted on the screwthread of the plunger and engaged by a worm 21.

The lever 16, worm 21 and worm wheel 20 form an "adjustable leverage pivot means" for adjusting the abutment strut 13.

As it is desirable to provide means for adjusting the abutment struts 13 of the sliders independently, the worm 21 for one of the sliders is mounted upon a transverse spindle 22 while the other is mounted upon a sleeve 23 coaxial with the spindle, a hand-wheel 24 being provided for rotating the sleeve 23. The spindle 22 is operated by a lever 25 secured to spindle 22 and having a handle 26 which is lockable in known manner to the hand-wheel 24. By this arrangement the worms 21 may be rotated either together or independently for the adjustment purposes above mentioned. This adjustment enables the vertical spacing of the shoes 9 with respect to the cutter bar 1 to be adjusted. The starting point of the stroke of the shoes, and consequently the position of the embosser stroke can be varied with respect to the dough sheet.

Any suitable means may be provided for oscillating the bell-crank levers 11, 12 for reciprocating the shoes 9 from a cam driven by the cutting machine. According to one mode the cutter bar 1 carries a parallel operating shaft 27 mounted in bearings on brackets 28. On the shaft 27 are fixed short levers 29 which are connected by links 30 to the ends of the vertical arms 12 of the bell-crank levers on the sliders. The shaft 27 is extended outwardly beyond the side frame of the machine and is supported by a bracket 31 and has at its end a lever 32 through which oscillatory motion is communicated thereto. The end of this lever is coupled to the end of a connecting rod 33 which extends downwardly towards the cutter bar driving shaft 6 which carries the eccentrics for reciprocating said bar. The lower end of the connecting rod 33 is coupled to one arm 34 of a bell-crank lever which carries at the angle a cam follower roller 35, the other arm 36 of the lever being pivotally mounted on a suitable fulcrum bracket 37 or the like. The connecting rod 33 may be coupled to the shaft lever 32 and follower lever 34, 36 in any suitable way or may be provided with means which enables the effective length of the rod to be extended or retracted, as required, for adjustment or setting up purposes. The cam follower 35 rides upon a cam 38 secured to the (outer end of the) drive shaft 6 which may be disposed adjacent the cutter eccentrics. As illustrated the cam 38 is mounted on a sleeve extension 39 of the eccentric sheave 40 of the cutter bar motion.

Spring means are provided upon the cutter bar to act directly upon the embosser depressing means or upon the sliders in opposition to the downward thrust exercised by the cam. According to one such arrangement, at the centre of the cutter bar a guideway is provided for a vertical rod 41 extending upwardly through the cutter bar. Around this rod a coaxial compression spring 42 is located bearing against a collar 43 on the upper end of the rod and taking an abutment against the top of the cutter bar. Upon the lower end of the rod 41 a double-armed lever 44 is slung, the arms of which extend through slots 45 in the sliders having their ends located to bear against a transverse surface 46 or portion of each slider unit; or the ends of the arms each abut against a stirrup by which the shoe is hung to its slider.

The resilience of the spring 42 is always operating to tend to raise the sliders 8 and thus the embosser assembly, to the uppermost position, and further maintains operative contact in the abutment 13 and strut assembly for the short arms 11 of each slider bell-crank lever.

To enable the machine to be used only as a cutting machine, the cutter-and-embosser block, Fig. 5, is removed from cutter bar 1, and is replaced by another known cutter block that is equipped with cutters only.

The movements of cam 38 should then be isolated from the embossing actuating mechanism and shoes 9, as follows: The side frame of the machine is provided with a rocker-shaft bracket 31 through which a set screw 47 is threaded. The end of the set screw 47 is arranged to engage the under side of the lever 32 which is on rocker-shaft 27. When set screw 47 is adjusted vertically upward the lever 32 is raised and with it the connecting rod 33 and the cam follower roller 35. The roller 35 is thus displaced out of the cam path and operatively is isolated from actions of the cam.

It will be apparent from the foregoing description that the embosser assembly partakes of the vertical reciprocations of the cutter bar 1 but that the displacements effected by the cam 38 upon its follower 35 will be superimposed by way of the cutter bar slider shoes 9 upon the embosser block or plate; and that while during the main period of descent of the cutter bar 1 the embossers will be carried with it, at a chosen point in the downward stroke, the distance between the embosser plate and the cutter bar can be extended or retracted as required: thus the position of embossing with respect to the cutting operation can be varied as required, as well as the time of embossing and the extent of displacement of the embosser plate, which factors are all determined by the setting and the design of cam 38. The cam is substantially circular. It is coaxial with pin 5 on driving shaft 6 and deviates from a circle along a small part of its periphery. The independent downward impression of the embossers due to the cam action may be small, for example it need not exceed ¼ inch.

The force raising the embossers is supplied by cutter bar spring 42. Retraction of the embosser plate is controlled by the setting and design of the cam 38. Spring 42 is carried by cutter bar 1 and acts on the shoe sliders 8 so as to maintain cam follower 35 in contact with the cam.

The cam 38 may be designed to give any desired dwell of the embossers while they are in embossing contact with the dough sheet, and to retract the embossers in their retractive movement and enable such to perform an ejecting action.

Having described my invention and a means by which I embody its principles in a practical apparatus, it will be observed that the parts and combinations employed are herein designated for purposes of description as: an embosser assembly; embosser depresser means; cam means for actuating said depressing means; spring means continually tending to raise the embosser assembly to uppermost position; means to isolate said cam means for the embossing actuating mechanism. Specifically, the improvement comprises means for displacing the follower roller clear of the cam for adjusting independently the setting of the embossers relatively to the cutter bar and cutter actuating mechanism; and adjustable leverage pivot means for adjusting the abutment strut.

I claim:

1. In a dough piece cutting and embossing machine having a reciprocative cutter bar and drive mechanism therefor; upright slideways on said cutter bar, an abutment member mounted on the cutter bar adjacent the slideway, a reciprocative slider in said slideways, an oscillatory lever pivotally mounted in the slider having an arm extended laterally and normally spring-pressed against said abutment member, and an upright arm on said lever angularly movable in the slider, a rocker shaft carried in bearings on the cutter bar, having operative connecting means to the upright arm of said oscillatory lever; and operative means connecting said rocker shaft to the drive mechanism of the machine.

2. A structure as set forth in claim 1 wherein the operative means that connects the rocker shaft to the drive mechanism of the machine comprises, in combination; a revolvable cam mounted on a crank pin of a drive shaft; a cam follower mounted on a bell-crank lever; a connecting rod pivotally connected to an arm of said bell-crank lever; a lever pivoted to the other end of said rod and adapted to actuate said rocker shaft and the slider in appropriately timed relation to reciprocative movements of said cutter bar.

3. In combination with a dough piece cutting and embossing machine having a reciprocative cutter bar and the drive mechanism associated therewith; upright slideways on said cutter bar; sliders in said ways; an abutment mounted on the cutter bar adjacent to the slideways; adjustment means adapted to vary the height of said abutment on the cutter bar; a bell-crank lever pivotally mounted for oscillating movements in the slider; said lever having an arm extended laterally; spring means urging said arm upwardly against said abutment; another arm on said bell crank lever movable through an angle in the slider; a rocker shaft mounted on the cutter bar operatively connected with said upright arm; and means connecting said rocker shaft operatively to said drive mechanism.

4. In a dough piece cutting and embossing machine having a reciprocative cutter bar and drive mechanism therefor; upright slideways on said cutter bar, an abutment member mounted on the cutter bar adjacent each slideway, a reciprocative slider in said slideway, an oscillatory lever mounted in the slider with an arm extended laterally and yieldingly urged against said abutment member, and an upright arm on said oscillatory lever angularly movable in the slider, a rocker-shaft carried in bearings on the cutter bar, having operative connecting means to the upright arm of said oscillatory lever; and operative means connecting said rocker-shaft to the drive mechanism of the machine.

5. In a dough piece cutting and embossing machine having a reciprocative cutter bar and drive mechanism therefor; upright slideways on said cutter bar, a reciprocative slider in each slideway, an oscillatory lever pivotally mounted in the slider having an arm extended laterally and normally spring-pressed and having an upright arm angularly movable in the slider; a rocker-shaft carried in bearings on the cutter bar, having operative connecting means to the upright arm of said oscillatory lever; and operative means connecting said rocker-shaft to the drive mechanism of the machine; an abutment member mounted on the cutter bar adjacent the slideway for engagement by said spring-pressed lateral arm.

6. In a dough piece cutting and embossing machine having a reciprocative cutter bar and drive mechanism therefor; upright slideways on said cutter bar, a reciprocative slider in each slideway, an oscillatory lever pivotally mounted in the slider having an arm extended laterally and normally spring-pressed and having an upright arm angularly movable in the slider; a rocker-shaft carried in bearings on the cutter bar, having operative connecting means to the upright arm of said oscillatory lever; and additional operative means connecting said rocker-shaft to the drive mechanism of the machine; an abutment member mounted on the cutter bar adjacent the slideway for engagement by said lateral arm and manually actuated adjustment means operatively associated with said abutment member for varying the oscillations of the said oscillating lever.

7. A structure as claimed in claim 6 wherein the said manual adjustment means comprises in combination, a horizontal pivoted lever arm engaging at one end the said abutment member and at the other end engaging a plunger slidable lengthwise in a guide provided on said slideway; a threaded portion on said plunger, a worm wheel nut threaded on said threaded portion and a manually operable worm and shaft adapted to actuate said lever for establishing appropriate limiting positions of said abutment member.

8. In a dough piece cutting and embossing mechanism as claimed in claim 6, a structure wherein the normally spring pressed laterally extended arm of said oscillatory lever is actuated by a compression spring seated on the cutter bar with a coaxial rod yieldingly supported therein, said rod having a horizontal lever member slung upon its lower end, an end of said slung lever normally engaging against the lower face of said slider.

9. In a dough piece working machine having a reciprocative cutter bar and having embosser operating mechanism secured on the bar; and drive mechanism for said embosser operating mechanism, said drive mechanism including an operating rocker-shaft mounted in a bracket on said cutter bar; an operating lever on the shaft; means for actuating said rocker-shaft comprising a connecting rod pivoted to the lever; a cam roller on said rod and a continuously operating cam normally engaged by said roller; adjustment means on said rocker-shaft bracket, arranged in operative relation to said rocker-shaft operating lever and adapted to lift said lever and said connecting rod for moving said cam roller clear of the cam, thereby operatively isolating said embosser operating mechanism from actions by the cam.

JOHN HART.

REFERENCES CITED

The following references are of record in the file of this patent:

UNITED STATES PATENTS

| Number | Name | Date |
|---|---|---|
| 621,041 | Danger | Mar. 14, 1899 |
| 814,485 | Vicars et al. | Mar. 6, 1906 |
| 1,292,311 | Green | Jan. 21, 1919 |
| 1,784,432 | Green | Dec. 9, 1930 |

FOREIGN PATENTS

| Number | Country | Date |
|---|---|---|
| 27,239 | Great Britain | Nov. 26, 1912 |
| 474,782 | Great Britain | Nov. 8, 1937 |
| 589,685 | Germany | Dec. 16, 1933 |
| 594,270 | Germany | Mar. 14, 1934 |